July 31, 1923.
A. L. FOUCHÉ
1,463,260
DEMOUNTABLE RIM
Filed Dec. 14, 1921
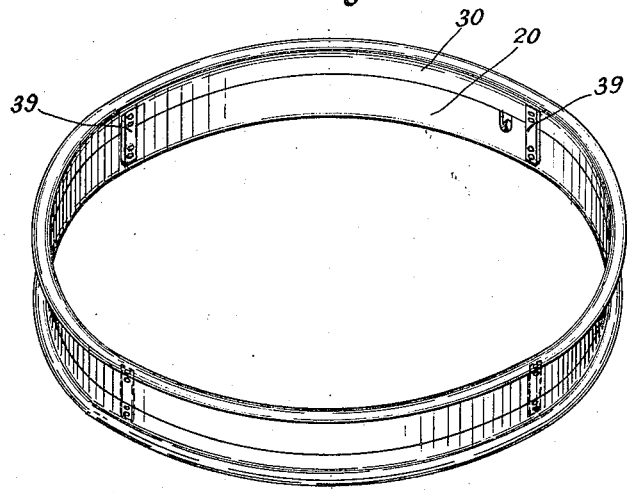
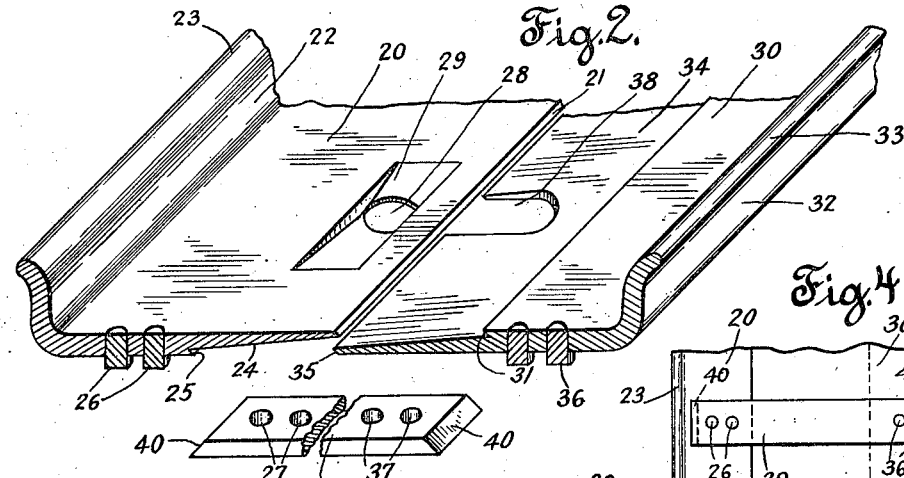
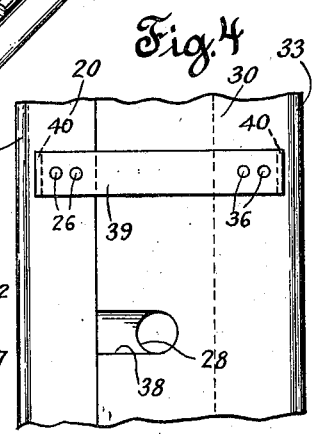
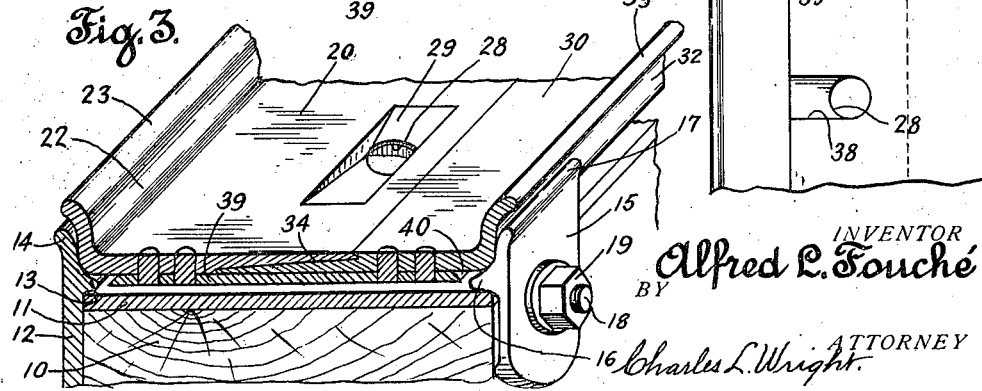
INVENTOR
Alfred L. Fouché
BY
Charles L. Wright
ATTORNEY Patented July 31, 1923.

1,463,260

UNITED STATES PATENT OFFICE.

ALFRED L. FOUCHÉ, OF ATLANTA, GEORGIA.

DEMOUNTABLE RIM.

Application filed December 14, 1921. Serial No. 522,217.

*To all whom it may concern:*

Be it known that I, ALFRED L. FOUCHÉ, a citizen of the United States, and a resident of Atlanta, in the county of Fulton and State of Georgia, have invented certain new and useful Improvements in Demountable Rims, of which the following is a specification.

The principal purpose of this invention is to provide a vehicle tire rim, of the demountable type, which permits the ready application or removal of a tire in an easy and convenient manner.

A further object is to provide a rim comprising two side elements connected by a central lapped joint, of relatively large area, having undercut edge surfaces, acting as annular stops and presenting smooth regular surfaces upon both sides of the rim.

Another object is in the provision of easily applied or removed connecting members which resist any strain tending to separate the side elements when in operative position.

Further objects are, to provide rims of superior efficiency and durability, that are economical in manufacture and simple in operation, no tools being required in mounting or demounting a tire therein.

These and analogous objects, which will become evident as the description progresses, are attained by the novel construction, combination and arrangement of parts, hereinafter described and shown in the accompanying drawings, forming a material part of this disclosure, and in which :—

Figure 1 is a perspective view showing a demountable rim made in accordance with the invention.

Figure 2 is an enlarged fragmentary view of the main elements of the rim, as separated and showing a transverse section of the same, with adjacent clamp plate.

Figure 3 is a similar view of the same, as in operative position on a wheel felly.

Figure 4 is a fragmentary view looking from the interior of the rim.

Referring to the drawing, now in particular to Figure 3, a wooden wheel felly is designated by the numeral 10, having a circumjacent metal band 11.

To one side of the felly, usually adjacent the vehicle, is secured a flat ring 12 having a projection 13 over the band 11 and continuing circumferentially outward, its edge 14 is bent laterally outward as shown.

On the other side of the wheel are a plurality of clips 15 having inwardly projecting elements 16 and outturned outer edges 17.

The clips are held by bolts 18 provided with nuts 19 or other similar fastening means, not germane to the invention, and it is to be understood that all of the elements hitherto enumerated are used merely as illustrative of conventional types of wheel construction.

The invention specifically consists in the construction of the parts disposed over the band 11 and comprises a pair of rim elements, generally designated by the numerals 20 and 30 respectively positioned adjacent the ring 12 and clips 15.

The element 20 has a smooth flat outer surface fashioned into an endless ring, its inner or meeting edge 21 being bevelled outwardly and its opposite, outer portion formed into a flange 22 terminating in an out-turned rounded edge 23.

The opposite, outer element 30 has an exposed outer surface of approximately one half that of the corresponding surface 20, or one third of the width of the tire used in connection.

The edge 31 is undercut and fitted to receive the extending bevelled edge 21 and the outer portion of the element is formed into a flange 32 terminating in a rounded edge 33, the flanges of both elements being similar but opposite in all respects.

A circumferential extension 34 of reduced thickness projects from the edge 31 towards the mating element, its width being substantially one third of the distance between the flanges, and its inner surface is disposed in register with the element 30.

The outer surface of the extension 34 is gradually reduced in thickness, as by scarfing, from the undercut edge 31 to the bevelled edge 35 and the inner surface 24 of the element 20 is increased in thickness from its bevelled edge 21 to a step 25, this step being undercut to receive the bevelled edge 35, these elements being so proportioned that when assembled in intimate relation as to present essentially smooth and level outer and inner surfaces.

In order to maintain the elements in such relation, pairs of pins 26 are fixed in the element 20 to extend through and beyond its inner surface at several points in its circumference, four being shown in the drawing.

The element 30 is similarly provided with like fixed pins 36 so arranged as to aline with the pins 26.

When so alined, the pins may be readily entered in pairs of openings 27 and 37 formed through plates 39 having bevelled end edges 40 by which they can be raised and disengaged from the pins as desirable.

Formed in the extension 34 is a slotted opening 38 and in the element 20 is a corresponding circular hole 28 through which may be passed the usual air inlet (not shown), the same being attached to the inner tube used in conjunction with the tire, a portion of the inlet valve being seated in the recess 29 surrounding the hole when the device is fully assembled; it will be apparent that the slot 38 permits the outer element to be applied or removed without interference with the valve tube.

In operation, the tire being deflated, the element 20 is entered into it, the valve passed through the opening 28 and the mating element 30 applied, pressure being used to force the elements towards each other until the edges are in contact, preventing further movement.

The plates 39 are then applied so that the several pairs of pins are engaged preventing separation of the elements, the tire mounted on the wheel rim and inflated as usual.

In dismounting the tire, the fastenings are removed, the demountable rim slipped off, and any convenient article, as a screw-driver, used as a lever along the undercut edges 40 of the clamp plates so as to remove them from engagement with the pins.

Thereupon a shock or jar given the rim suffices to cause its two main portions to separate, permitting removal of the tire.

Although the foregoing is descriptive of the preferred embodiment of the invention, it will be apparent that minor changes may be made in its construction, without the exercise of invention or conflicting with the scope of the claim hereto appended.

Having thus described my invention, what I claim as new and desire to secure by Letters Patent, is:—

A demountable rim comprising a pair of bands having attenuated lateral elements arranged in overlapping relation at their circumferential joints, cylindrical pins fixed in aligned pairs to extend from the inner surfaces of each band, clamp plates having round openings receptive of said pins to hold the plates in close relation, and bevelled extensions on the ends of said clamp plates facilitating their removal.

In testimony whereof I have signed my name to this specification.

ALFRED L. FOUCHÉ.